United States Patent
Shao (12) United States Patent (10) Patent No.: US 7,315,577 B2
(45) Date of Patent: Jan. 1, 2008

(54) MULTIPLE ANTENNA SYSTEMS AND METHOD USING HIGH-THROUGHPUT SPACE-FREQUENCY BLOCK CODES

(75) Inventor: Lei Shao, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 10/814,113

(22) Filed: Mar. 30, 2004

(65) Prior Publication Data

US 2005/0058212 A1    Mar. 17, 2005

Related U.S. Application Data

(60) Provisional application No. 60/503,092, filed on Sep. 15, 2003, provisional application No. 60/536,071, filed on Jan. 12, 2004.

(51) Int. Cl.
*H04L 27/28* (2006.01)
*H04N 7/10* (2006.01)

(52) U.S. Cl. ........................ 375/260; 375/347

(58) Field of Classification Search ................ 375/260, 375/347, 267, 299, 295, 316; 455/101, 132; 324/614; 370/343
See application file for complete search history.

(56) References Cited

U.S. PATENT DOCUMENTS

| | | | |
|---|---|---|---|
| 5,311,456 A | 5/1994 | Chiang et al. | |
| 5,960,351 A | 9/1999 | Przelomiec | |
| 6,430,441 B1 | 8/2002 | Levine | |
| 6,452,981 B1* | 9/2002 | Raleigh et al. | 375/299 |
| 7,224,744 B2* | 5/2007 | Giannakis et al. | 375/267 |
| 2001/0033611 A1 | 10/2001 | Grimwood et al. | |
| 2002/0173271 A1 | 11/2002 | Blair et al. | |
| 2003/0043732 A1 | 3/2003 | Walton et al. | |
| 2003/0083703 A1 | 5/2003 | Zhu et al. | |
| 2003/0095533 A1* | 5/2003 | Joo et al. | 370/343 |
| 2003/0161282 A1 | 8/2003 | Medvedev et al. | |
| 2003/0204210 A1 | 10/2003 | Ousdigian et al. | |
| 2003/0208241 A1 | 11/2003 | Bradley et al. | |
| 2004/0258174 A1 | 12/2004 | Shao et al. | |
| 2005/0031047 A1 | 2/2005 | Maltsev et al. | |
| 2005/0058217 A1 | 3/2005 | Sandhu et al. | |
| 2005/0128936 A1 | 6/2005 | Shao | |

(Continued)

FOREIGN PATENT DOCUMENTS

EP    0939527 A1    9/1999

(Continued)

OTHER PUBLICATIONS

"802.11g™ IEEE Local and Metropolitan Area Networks; Part 11: Wireless LAN Medium Access Control (MAC) and Physical Layer (PHY) specifications; Amendment 4:Further Higher Data Rate extension in the 2.4 GHz Band", *IEEE Std. 802.11Gtm-2003*, The Institute of Electrical and Electronics Engineers, Inc. NY,(Jun. 27, 2003), 78 pgs.

(Continued)

*Primary Examiner*—Khai Tran
(74) *Attorney, Agent, or Firm*—Schwegman, Lundberg & Woessner, P.A.; Gregory J. Gorrie (57) ABSTRACT

A multicarrier transmitter uses high-throughput space-frequency block codes to map transmit symbols to a particular transmit antenna and a particular subcarrier of a multicarrier communication channel.

39 Claims, 6 Drawing Sheets

U.S. PATENT DOCUMENTS

| | | |
|---|---|---|
| 2005/0141412 A1 | 6/2005 | Sadri et al. |
| 2005/0152299 A1 | 7/2005 | Stephens |
| 2005/0152330 A1 | 7/2005 | Stephens et al. |
| 2005/0152357 A1 | 7/2005 | Stephens |
| 2005/0152465 A1 | 7/2005 | Maltsev et al. |
| 2005/0152466 A1 | 7/2005 | Maltsev et al. |
| 2005/0152473 A1 | 7/2005 | Maltsev et al. |
| 2005/0152484 A1 | 7/2005 | Sandhu et al. |
| 2005/0154957 A1 | 7/2005 | Jacobsen |
| 2005/0154958 A1 | 7/2005 | Xia et al. |
| 2005/0166131 A1 | 7/2005 | Xia et al. |
| 2005/0174927 A1 | 8/2005 | Stephers et al. |

FOREIGN PATENT DOCUMENTS

| | | |
|---|---|---|
| EP | 1187506 A1 | 3/2002 |
| EP | 1240918 A2 | 9/2002 |
| EP | 1411647 A2 | 4/2004 |
| EP | 1533963 A2 | 5/2005 |
| GB | 2384651 | 7/2003 |
| WO | WO-97/37441 A1 | 10/1997 |
| WO | WO-97/47147 A1 | 12/1997 |
| WO | WO-01/59965 A1 | 8/2001 |
| WO | WO-01/95579 A2 | 12/2001 |
| WO | WO-03/001702 A1 | 1/2003 |
| WO | WO-03/047198 A2 | 6/2003 |
| WO | WO-2004/047354 A1 | 6/2004 |
| WO | WO-2005/025471 A1 | 3/2005 |
| WO | WO-2005/029758 A2 | 3/2005 |
| WO | WO-2005/029759 A2 | 3/2005 |
| WO | WO-2005/034435 A2 | 4/2005 |
| WO | WO-2005/067171 A1 | 7/2005 |
| WO | WO-2005/069572 A1 | 7/2005 |
| WO | WO-2005/069573 A1 | 7/2005 |
| WO | WO-2005/069667 A1 | 7/2005 |
| WO | WO-2005/071871 A1 | 8/2005 |
| WO | WO-2005/071910 A1 | 8/2005 |
| WO | WO-2005/071912 A1 | 8/2005 |
| WO | WO-2005/122515 A1 | 12/2005 |

OTHER PUBLICATIONS

"International Search report for corresponding PCT Application No. PCT/US2004/029698", (Jun. 13, 2005), 7 pgs.

"Supplement to IEEE Standard for Information Technology- Telecommunications and Information Exchange Between Systems-Local and Metropolitan Area Networks—Specific Requirements—Part 11: Wireless LAN Medium Access Control (MAC) and Physical Layer (PHY)", *IEEE Std. 802.11a-1999*, IEEE Computer Society, New York, NY, (1999 (reaffirmed Jun. 12, 2003)), 91 pgs.

"Supplement to IEEE Standard for IT-Telecomm. & Info. Exchange Between Systems—Local and Metropolitan Area Networks—specific requirements. Part 11:Wireless LAN Medium Access Control(MAC)and Physical Layer(PHY)Specs:High-speed Physical Layer in 5GHZ Band", *IEEE Std. 802.11a-1999*, (Dec. 30, 1999), 90 pgs.

Abdul Aziz, M. K., et al., "Indoor Throughput and Range Improvements Using Standard Compliant AP Antenna Diversity in IEEE 802.11a and ETSI HIPERLAN/2", *VTC 2001 Fall. IEEE VTS 54th Vehicular Technology Conference*, 2001, vol. 4, (Oct. 7-11, 2001), 2294-2298.

Bangerter, B., et al., "High-Throughput Wireless LAN Air Interface", *Intel Technology Journal*, 7(3), http://developer.intel.com/technology/itj/index.htm,(Aug. 9, 2003), 47-57.

Böhnke, R., et al., "Reduced Complexity MMSE Detection for BLAST Architectures", *GLOBECOM 2003—IEEE Global Telecommunication Conferrence Proceedings*, 7 (7), (Dec. 1, 2003), 2258-2262.

Bölcskei, H., "Space-Frequency Coded MIMO-OFDM with variable Multiplexing-Diversity Tradeoff", *IEEE International Conference on Communications*, 4, (May 11, 2003), 2837-2841.

Choi, B., et al., "Optimum Mode-Switching-Assisted Constant-Power Single-and Multicarrier Adaptive Modulation", *IEEE Transactions on Vehicular Technology*, 52(3), (May 2003), 536-560.

Chung, C., et al., "Estimation of delay offset in multi-carrier differential phase modulation systems", *Communication Technology Proceedings of ICCT2003*, 2, (Apr. 9, 2003), 1848-1851.

Cioffi, J. M., "Chapter 4—Multi-Channel Modulation", *Lectures on Digital Communications, Stanford University*, Available from http://www.stanford.edu/class/ee379c/, (2001), 278-314.

Damen, M. O., et al., "On Maximum-Likelihood Detection and the Search for the Closest Lattice Point", *IEEE Transactions on Information Theory, IEEE Inc.* 49(10), (Oct. 1, 2003), 2389-2402.

Dammann, A., et al., "Transmit/Receive—Antenna—Diversity Techniques For OFDM Systems", *European Transactions on Telecommunications*, 13 (5), Multi-Carrier Spread-Spectrum and Related Topics, (Sep. 2002), 531-538.

Fujino, Y., et al., "Transmitter With Antenna Array For MC-CDMA Forward Link", *IEEE Antennas and Propagation Society International Symposium*, (Jun. 22, 2003), 847-850.

Higuchi, K., et al., "Adaptive Selection of Surviving Symbol Replica Candidates Based on Maximum Reliabilty in QRM-MLD for OFCDM MIMO Multiplexing", *Proceedings, IEEE Global Telecommunications Conference (GLOBECOM '04)*, (Nov. 29, 2004), 2480-2486.

Hutter, A. A., et al., "Effects of Fading Correlation on Multiple Antenna Reception Mobile OFDM Systems", *IEEE Vehicular Technology Conference*, (Sep. 24, 2000),2744-2749.

Leke, A., et al., "A maximum rate loading algorithm for discrete multitone modulation systems", *GLOBECOM '97, Global Telecommunications Conference*, 1997, vol. 3, (Nov. 8, 1997),1514-1518.

Ma, X., "Complex Field Coded MIMO Systems: Performance, Rate, and Trade-Offs", *Wireless Communications and Mobile Computing*, 2, (Oct. 2002), 693-717.

Paulraj, A., "Introduction to Space-Time Wireless Communications", *Introduction to Space-Time Wireless Communications*, Cambridge University Press, Cambridge, UK,(May 2003), 4 pgs.

Rende, D., et al., "Bit Interleaved Space-frequency Coded Modulation for OFDM Systems", *IEE International Conference on Communication*, vol. 1 of 5, Wireless Information and Networking Group, (ICC 2003), (May 11, 2003), 2827-2831.

Sampath, H., et al., "Linear Precoding and Decoding for Multiple Input Multiple Output(MIMO) Wireless Channels", Dissertation, Doctor Philosophy, Department of Electrical Engineering, Stanford University (Apr. 2001), 157 pgs.

Sandhu, S., et al., "Analog Combining of Multiple Receive Antennas With OFDM", *IEEE International Conference on Communications*, (May 11, 2003), 3428-3432.

Seethaler, D., et al., "Efficient Approximate-ml Detection for Mimo Spatial Multiplexing Systems by Using a 1-D Nearest Neighbor Search", *Proceedings of the 3rd IEEE International Symposium on Signal Processing and Information Technology* (ISSPIT 2003), (Dec. 14, 2003),290-293

Shao, L., "High Rate Space Frequency Block Codes for Next Generation 802.11 WLANs", *IEEE International Conference on Communications*, 5, (Jun. 20, 2004), 2995-2999.

Simoens, S., et al., "Optimum Performance of Link adaption in HIPERLAN/2 networks", *IEEE 53rd Vehicular Technology Conference*, (VTC, 2001) vol. 2 of 4, (May 6-9, 2001), 1129-1133.

Slimane, B. S., "A Low Complexity Antenna Diversity Receiver For OFDM Based Systems", *IEEE International Conference on Communications*, (Jun. 6, 2001),1147-1151.

Tian, Q., et al., "The Performance of Multi-Carrier CDMA with Base Station Antenna Arrays in Fading Channels", *Vehicular Technology Conference*, (May 15, 2000), 1498-1502.

Wang, Z., "Complex-Field Coding for OFDM Over Fading Wireless Channels", *IEEE Transactions on Information Theory*, 49(2), (Mar. 2003), 707-720.

Yih, C. H., et al., "Adaptive Modulation, Power Allocation and Control for OFDM Wireless Networks", *IEEE 11th Annual Symposium on Personal, Indoor and Mobile Radio Communication*, 2, (Sep. 18, 2000), 809-813.

Yuan, H., et al., "An Adaptive Array Antenna with Path Selection of OFDM Signal", *European Personal Mobile Communications Conference.*, (Apr. 22, 2003),412-416.

Yue, J., et al., "Channel Estimation and Data Detection for MIMO-OFDM Systems", *Proceedings, IEEE Global Telecommunications Conference. (GLOBECOM '03)*, 7(7), (Dec. 1, 2003), 581-585.

Zhen, L., et al., "A Modified Sub-Optimum Adaptive Bit and Power Allocation Algorithm in Wideband OFDM System", *Canadian Conference on Electrical and Computer Engineering,* (CCECE 2003), vol. 3 of 3, (May 4, 2003), 1589-1592.

Alamouti, Siavash M., "A Simple Transmit Diversity Technique for Wireless Communications", *IEEE Journal on Select Areas in Communications*, 16(8). (Oct., 1998), 1451-1458.

Tarokh, Vahid, et al., "Space-Time Codes for High Data Rate Wireless Communication: Performance Criterion and Code Construction", *IEEE Transactions on Information Theory*, 44(2), (Mar., 1998), 744-765.

\* cited by examiner

MULTIPLE ANTENNA SYSTEMS AND METHOD USING HIGH-THROUGHPUT SPACE-FREQUENCY BLOCK CODES

CROSS-REFERENCE TO RELATED APPLICATIONS

This application claims the benefit of priority under 35 U.S.C. 119(e) to U.S. Provisional Patent Application Ser. No. 60/503,092, filed Sep. 15, 2003, and to U.S. Provisional Patent Application Ser. No. 60/536,071, filed Jan. 12, 2004, both of which are incorporated herein by reference.

TECHNICAL FIELD

Embodiments of the present invention pertain to wireless communications, and in some embodiments, to multicarrier communication systems.

BACKGROUND

To increase the data rate and/or throughput of wireless communications, wireless signals may be transmitted using more than one transmit antenna over more than one spatial channel utilizing the same frequency subcarriers. These systems are sometimes referred to multiple-input multiple-output (MIMO) systems and may exploit the multipath diversity between the antennas. Conventional MIMO systems may encode the signals using convolutional encoding and/or Viterbi encoding, however these techniques are sensitive to antenna separation and antenna fading correlation.

Thus there are general needs for apparatus and methods for increasing the data rate and/or throughput of wireless communications.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
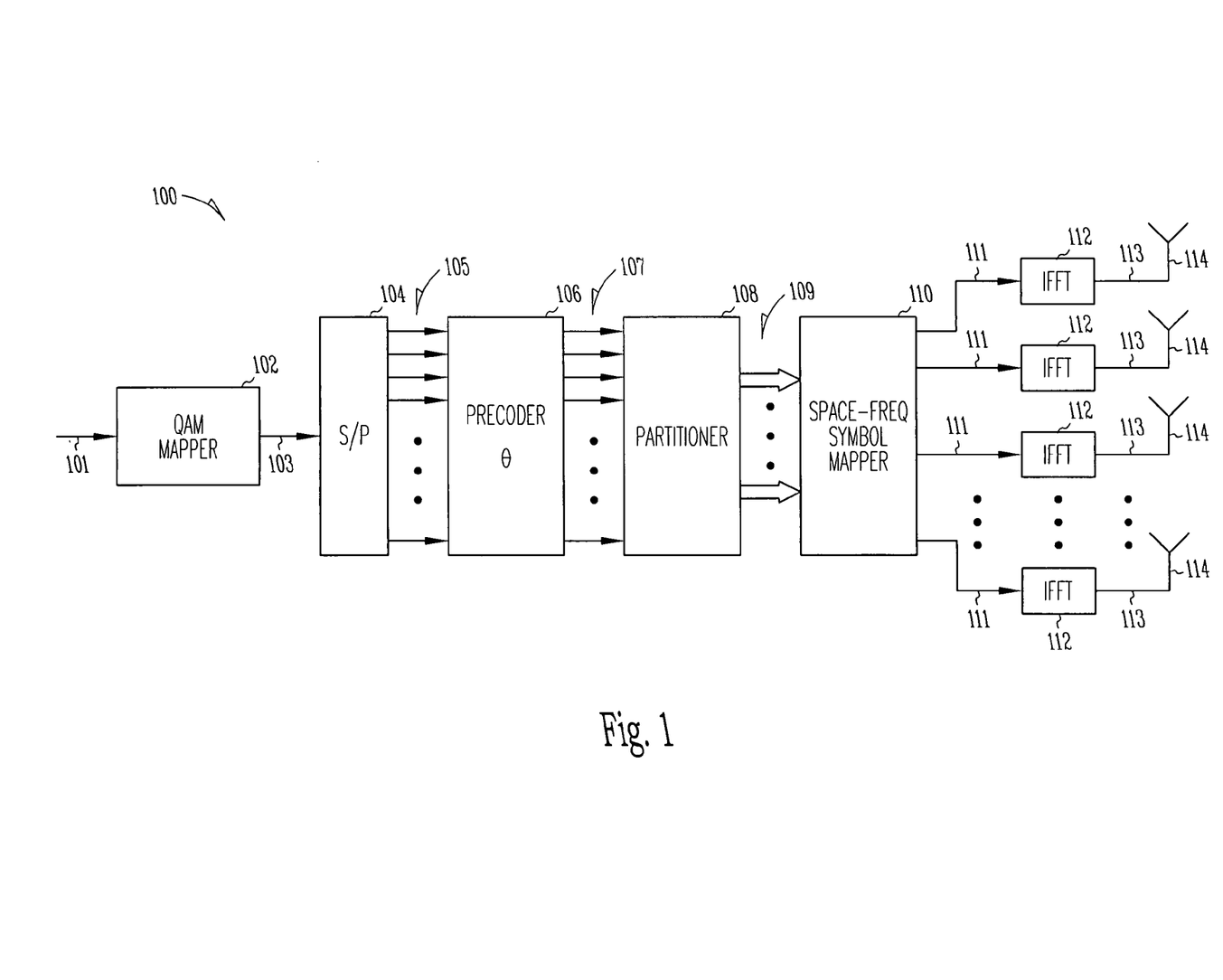
FIG. 1 is a block diagram of a multicarrier transmitter in accordance with some embodiments of the present invention.

FIG. 1 is a block diagram of a multicarrier transmitter in accordance with some embodiments of the present invention. Multicarrier transmitter 100 may be part of a wireless communication device, and may transmit multicarrier communication signals, such as orthogonal frequency division multiplexed (OFDM) communication signals, over a multicarrier communication channel.

In some embodiments, multicarrier transmitter 100 encodes symbols for transmission on a multicarrier communication channel comprising more than one spatial channel and may use more than one of transmit antennas 114. In some embodiments, multicarrier transmitter 100 uses high-throughput space-frequency block codes and may not require the use of convolutional or error-correcting coding, although the scope of the present invention is not limited in this respect. In some embodiments, the use of high-throughput space-frequency block codes by multicarrier transmitter 100 may eliminate the need for Viterbi decoding, although the scope of the invention is not limited in this respect. In some embodiments, increased throughput and/or increased range may be achieved through the use of high-throughput space-frequency block codes over systems using convolutional codes with similar bit-error rates and bandwidths.

In some embodiments, multicarrier transmitter 100 may comprise precoder 106 to encode a plurality of symbol vectors 105 by multiplying each symbol vector 105 by a complex field matrix to generate precoded symbol vectors 107. In some embodiments, multicarrier transmitter 100 may comprise partitioner 108 to group precoded symbol vectors 107 into a plurality of groups 109. Each group 109 may more than one of precoded symbol vectors 107. In some embodiments, multicarrier transmitter 100 may also comprise space-frequency symbol mapper 110 to map each precoded symbol of the precoded symbol vectors 107 to one of a plurality of subcarriers of a multicarrier communication channel and to one of a plurality of spatial channels. In some embodiments, space-frequency symbol mapper 110 may map precoded symbols to one of the subcarriers and to one of the spatial channels at least in part based on the symbol's group and the symbol's position within the group, although the scope of the present invention is not limited in this respect.

In some embodiments, space-frequency symbol mapper 110 may map precoded symbols to one of the subcarriers and to one of transmit antennas 114 based at least in part based on the symbol's group and the symbol's position within the group, although the scope of the present invention is not limited in this respect. In these embodiments, each of transmit antennas 114 may be associated with one of the spatial channels, although the scope of the invention is not limited in this respect.

In some embodiments, multicarrier transmitter 100 may further comprise symbol mapper 102 to generate a serial symbol stream of symbols 103 from an input serial bit stream 101. In some embodiments, mapper 102 may be quadrature amplitude modulated (QAM) symbol mapper to generate a serial symbol stream of QAM symbols, although the scope of the invention is not limited in this respect. In some embodiments, multicarrier transmitter 100 may further comprise serial-to-parallel converter 104 to generate the plurality of parallel symbol vectors 105 from the serial symbol stream. Each of symbol vectors 105 may have more than one symbol. In some embodiments, parallel symbol vectors 105 may be QAM symbol vectors.

In some embodiments, multicarrier transmitter 100 may further comprise inverse fast Fourier transform (IFFT) circuitry 112 to generate signals 113 for RF transmission on a corresponding one of the spatial channels or a corresponding one of transmit antennas 114 from space-frequency mapped symbols 111 provided by space-frequency symbol mapper 110. In some embodiments, signals 113 may be packetized signals for transmission. In some embodiments, circuitry may be included in the signal path after IFFT circuitry 112 to add a cyclic prefix (CP) to signals 113 to help reduce inter-symbol interference, although the scope of the present invention is not limited in this respect. In some embodiments, each of transmit antennas 114 may correspond to one of the spatial channels, although the scope of the present invention is not limited in this respect.

In some embodiments, precoder 106 may be a linear-square precoder and may separately precode each of parallel symbol vectors 105 to generate a plurality of parallel precoded symbol vectors 107. In some embodiments, the complex field matrix (e.g., theta) used by precoder 106 may be a square complex field matrix having a substantially row-wise Vandermonde structure, although the scope of the invention is not limited in this respect. A Vandermonde matrix may refer to a type of matrix that arises in the polynomial least squares fitting of Lagrange interpolating polynomials and the reconstruction of a statistical distribution from the distribution's moments, although the scope of the invention is not limited in this respect.

In some embodiments, precoder 106 may encode an M×G number of parallel symbol vectors 105, and each parallel symbol vector 105 may have M×K symbols. In these embodiments, partitioner 108 may group precoded symbol vectors 107 into G groups 109 of the parallel symbol vectors 107. Each of groups 109 may have M of the precoded symbol vectors 107. In these embodiments, M, G and K may be selected to satisfy the equation Nc=M×K×G, in which Nc may refer to the number of data subcarriers of the multicarrier channel. M, G and K may be positive integers less than 100, although the scope of the present invention is not limited in this respect. In some embodiments, M may correspond to a number of spatial channels and/or transmit antennas 114. For example, when the multicarrier communication channel comprises sixteen data subcarriers and the transmitter uses four transmit antennas, M may be four, G may be two and K may be two. The total number of symbols transmitted may be the number of symbols per symbol vector (i.e., M×K) times the number of vectors (i.e., M×G) which would be 64 symbols. Sixteen symbols (i.e., one for each of the sixteen data subcarriers) may be modulated by each of IFFT circuitry 112 and transmitted by a corresponding one of transmit antennas 114. In embodiments, K and G may be selected based on the number of subcarriers and the number of antennas, among other things.

Figure 2:
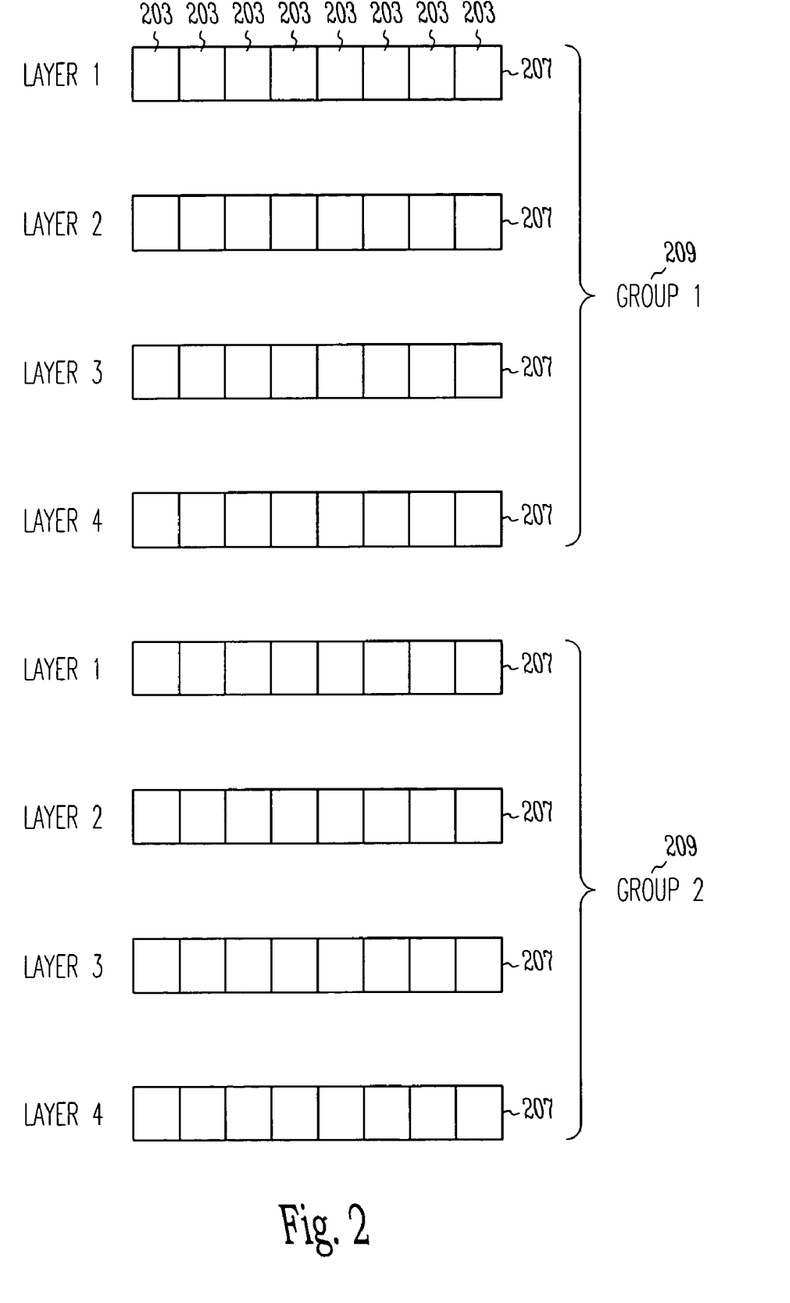
FIG. 2 illustrates precoded symbol vectors in accordance with some embodiments of the present invention.

FIG. 2 illustrates precoded symbol vectors in accordance with some embodiments of the present invention. In some embodiments, the symbols of precoded symbol vectors 207 may be associated with a layer of symbols. Precoded symbol vectors 207 may correspond to precoded symbol vectors 107 (FIG. 1), although the scope of the invention is not limited in this respect. Precoded symbol vectors 207 may be grouped into two or more groups 209. Each precoded symbol vector 207 may comprise a plurality of precoded symbols 203. In some embodiments, there may be M layers for each of G groups. In some embodiments, the number of layers M may at most be no more than the number of transmit antennas. In these embodiments, a space-frequency symbol mapper, such as space-frequency symbol mapper 110 (FIG. 1), may map each precoded symbol 203 of the precoded symbol vectors 207 to one of the subcarriers and to one of the transmit antennas based on the group and the layer associated with the symbol. In these embodiments, space-frequency symbol mapper 110 (FIG. 1) may map M×K×G symbols to each transmit antenna and/or spatial channel and may provide the mapped symbols in multiples of the M×K×G symbols to IFFT circuitry, such as IFFT circuitry 112 (FIG. 1), associated with the transmit antennas for modulation on the subcarriers. FIG. 2 illustrates embodiments of the present invention which include four layers for each of the two groups (i.e., groups 109) of precoded symbol vectors 207 in which each of precoded symbol vectors 207 comprises eight of precoded symbols 203. In this illustrated example, there may be sixteen data subcarriers of the multicarrier communication channel, although the scope of the present invention is not limited in this respect.

In some embodiments, space-frequency symbol mapper 110 (FIG. 1) may map at least some precoded symbols 203 of the layers to the subcarriers and the transmit antennas in a sequential manner based on the precoded symbol's group and position within the group, although the scope of the present invention is not limited in this respect. In some embodiments, a first precoded symbol of a first group may be mapped to a first subcarrier and first transmit antenna, a second precoded symbol of the first group may be mapped to a second subcarrier and a second transmit antenna, etc. The specific mapping may be selected to achieve, among other things, increased diversity.

Figure 3:
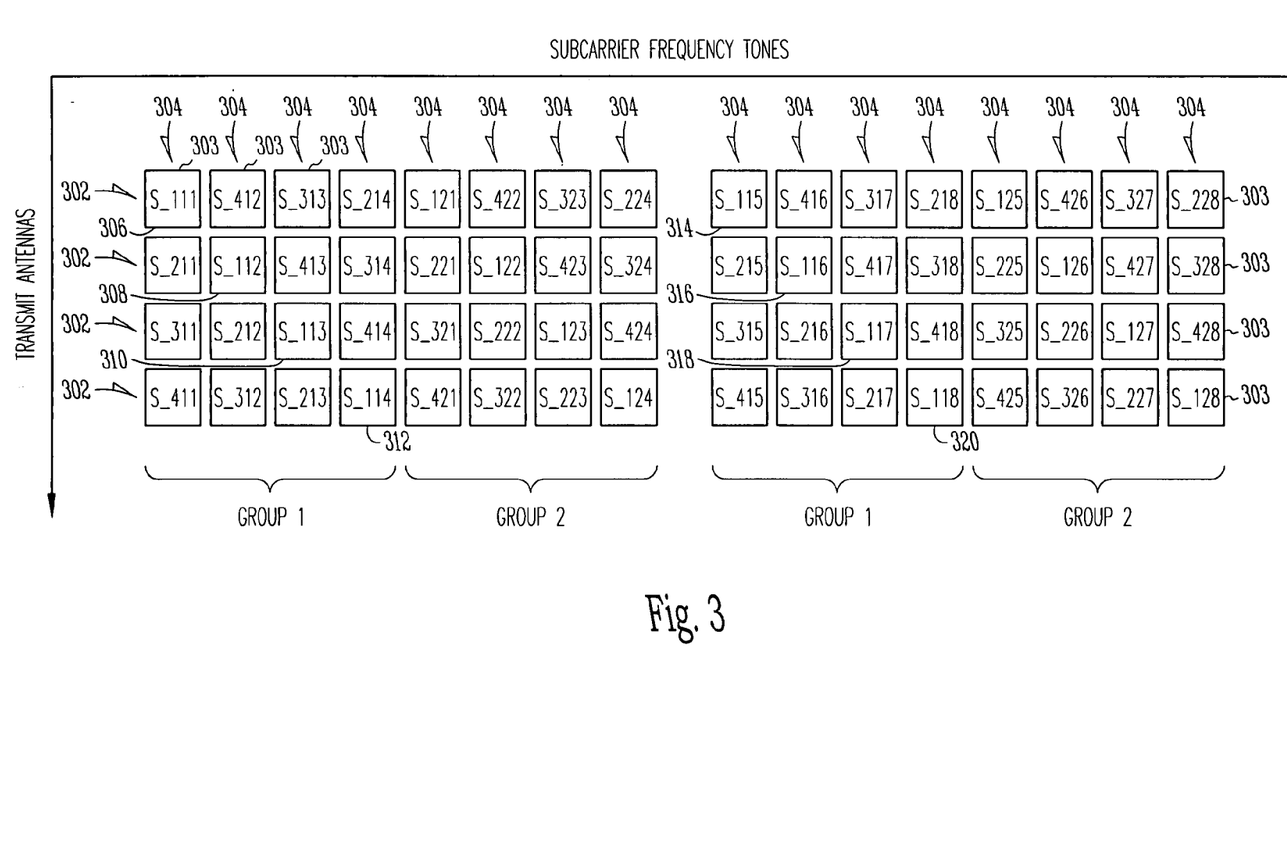
FIG. 3 illustrates space-frequency mapping in accordance with some embodiments of the present invention.

FIG. 3 illustrates space-frequency mapping in accordance with some embodiments of the present invention. Precoded symbols 303 may be mapped to one of transmit antennas 114 (FIG. 1) or spatial channels 302 (illustrated in rows) and to one of subcarriers 304 (illustrated in columns) based on the precoded symbol's layer and group. In FIG. 3, precoded symbols 303 may correspond to precoded symbols 203 (FIG. 2) and are illustrated as $s_{ijk}$, in which i represents the $i^{th}$ layer, j represents the group number and k represents the $k^{th}$ precoded symbol. In the example illustrated having sixteen data subcarriers, precoded symbols 303 of the first group may be mapped to subcarriers one through four and subcarriers nine through twelve, while precoded symbols 303 of the second group may be mapped to subcarriers five through eight and subcarriers thirteen through sixteen.

In some embodiments, precoded symbols 303 of a particular layer may be mapped diagonally in this illustration. For example, for symbols of the first group, first symbol 306 of the first layer may be mapped to the first subcarrier and the first transmit antenna, second symbol 308 of the first layer may be mapped to the second subcarrier and the second transmit antenna, third symbol 310 of the first layer may be mapped to the third subcarrier and the third transmit antenna, fourth symbol 312 of the first layer may be mapped to the fourth subcarrier and the fourth transmit antenna, fifth symbol 314 of the first layer may be mapped to the ninth subcarrier and the first transmit antenna, sixth symbol 316 of the first layer may be mapped to the tenth subcarrier and the second transmit antenna, seventh symbol 318 of the first layer may be mapped to the eleventh subcarrier and the third transmit antenna, and eighth symbol 310 of the first layer may be mapped to the twelfth subcarrier and the fourth transmit antenna. This mapping may be similarly applied to the other layers and the other groups as illustrated in FIG. 3. Other mappings based on layers and groups may also be performed by space-frequency symbol mapper 110 (FIG. 1).

Referring to FIG. 1, in some embodiments, the spatial channels may be correlated (e.g., non-orthogonal in frequency) channels. In these embodiments, each spatial channel may employ the same frequency symbol-modulated subcarriers. In some embodiments, uncorrelation (e.g., at least partial orthogonality) between the spatial channels may be achieved through antenna separation. In some embodiments, transmit antennas 114 may have a spacing therebetween of at least approximately a half-wavelength of a transmit frequency. In some embodiments, the spacing may be selected so that the different antennas undergo uncorrelated channel fading. In some embodiments, the high-throughput space-frequency block codes employed by multicarrier transceiver 100 may not be sensitive to small antenna spacing or separations, and may be robust to antenna fading correlations. In some embodiments, the antenna separation may be small relative to the wavelength of transmission. In some embodiments, uncorrelation between the spatial channels may be achieved through beamforming, although the scope of the invention is not limited in this respect.

Is some embodiments, the multicarrier communication channel may comprise a plurality of symbol-modulated subcarriers. In some embodiments, each symbol-modulated subcarrier may have a null at substantially a center frequency of the other subcarriers to achieve substantial orthogonality between the subcarriers of the multicarrier communication channel. In some embodiments, the multicarrier communication channel may be an orthogonal frequency division multiplexed (OFDM) communication channel comprising a plurality of OFDM subcarriers, although the scope of the invention is not limited in this respect.

In some embodiments, multicarrier transmitter 100 may utilize more than one of spatially-diverse transmit antennas 114 to "divide" the channel into one or more spatial channels. In some embodiments, each transmit antenna may define one spatial transmit channel. In other embodiments, multicarrier transmitter 100 may employ beamforming techniques to "divide" the channel into spatial channels. In these embodiments, each spatial channel may be used to communicate separate or independent data streams on the same subcarriers as the other spatial channels, allowing the communication of additional data without an increase in frequency bandwidth. The use of spatial channels may take advantage of the multipath characteristics of the channel. In some embodiments, the spatial channels may be non-orthogonal channels, although the scope of the invention is not limited in this respect.

In some embodiments, serial-to-parallel converter 104 may operate in the signal path prior to mapper 102. In accordance with some embodiments, mapper 102 of multicarrier transmitter 100 may symbol-modulate the subcarriers in accordance with individual subcarrier modulation assignments. This may be referred to as adaptive bit loading (ABL). Accordingly, one or more bits may be represented by a symbol modulated on a subcarrier. The modulation assignments for the individual subchannel may be based on the channel characteristics or channel conditions for that subcarrier, although the scope of the invention is not limited in this respect. In some embodiments, the subcarrier modulation assignments may range from zero bits per symbol to up to ten or more bits per symbol.

In some embodiments, a multicarrier symbol may be viewed as the combination of the symbols modulated on the individual subcarriers. Because of the variable number of bits per symbol-modulated subcarrier and the variable number of subchannels that may comprise a multicarrier channel, the number of bits per multicarrier symbol may vary greatly.

In some embodiments, the frequency spectrums for a multicarrier communication channel may comprise subcarriers in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

Figure 4:
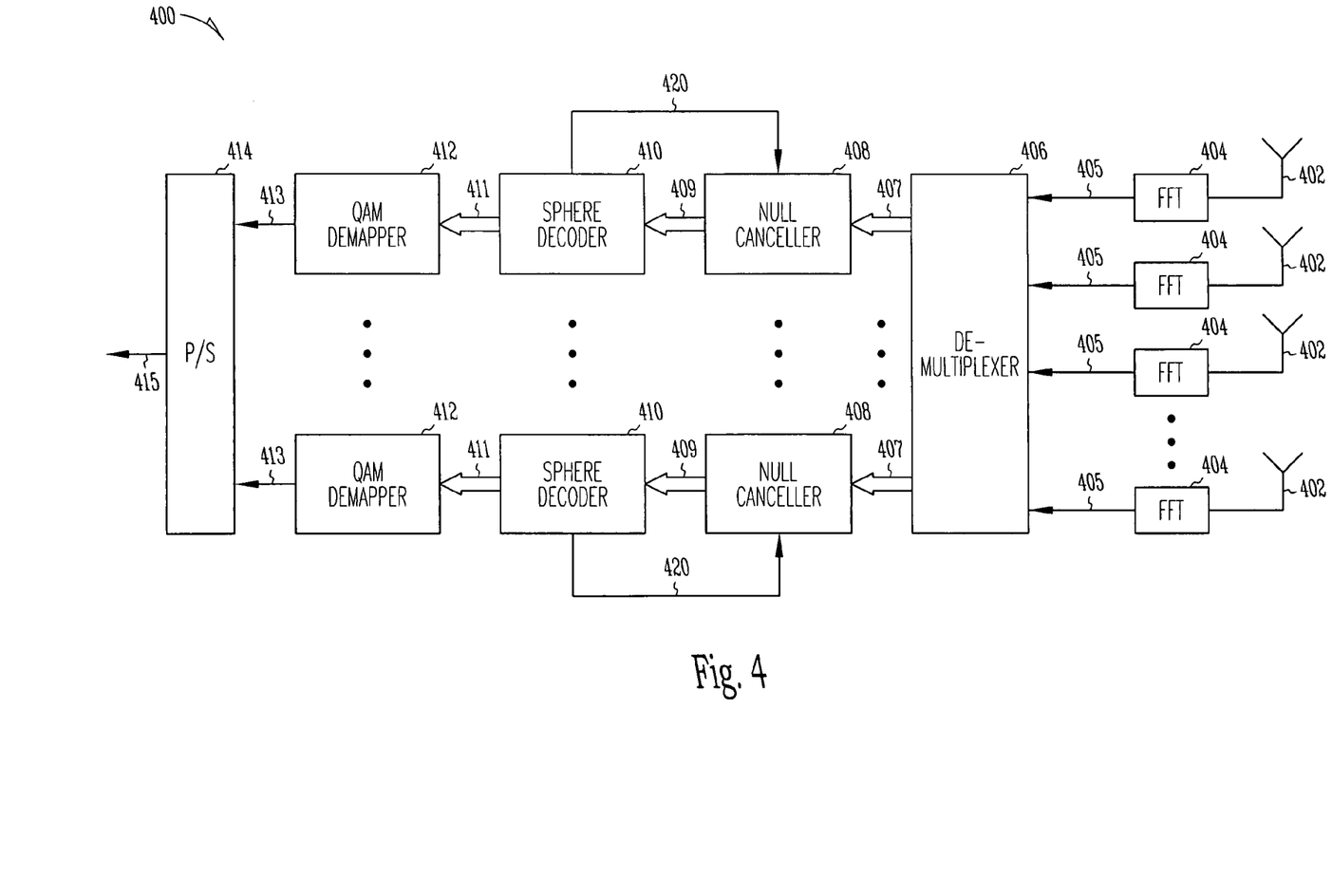
FIG. 4 is a block diagram of a multicarrier receiver in accordance with some embodiments of the present invention.

FIG. 4 is a block diagram of a multicarrier receiver in accordance with some embodiments of the present invention. Multicarrier receiver 400 may be part of a wireless communication device, and may receive multicarrier communication signals, such as OFDM communication signals, over a multicarrier communication channel. In some embodiments, multicarrier receiver 400 may be part of a communication station which may also comprise a multicarrier transmitter, such as multicarrier transmitter 100 (FIG. 1), although other multicarrier transmitters may also be suitable.

In some embodiments, multicarrier receiver 400 may receive signals over a multicarrier communication channel over more than one spatial channel and may use more than one of receive antennas 402. In some embodiments, multicarrier receiver 400 decodes signals that may have been encoded with high-throughput space-frequency block codes and may not require the use convolutional or error-correcting decoding, although the scope of the present invention is not limited in this respect. In some embodiments, the use of high-throughput space-frequency block codes may eliminate the need for Viterbi decoding, although the scope of the invention is not limited in this respect. In some embodiments, increased throughput and/or increased range may be achieved through the use of high-throughput space-frequency block codes over systems using convolutional codes with similar bit-error rates and bandwidths. In some embodiments, multicarrier receiver 400 decodes signals received over a multicarrier communication channel encoded with high-throughput space-frequency block codes using an iterative nulling process to successively cancel interference from layers of the symbols.

In some embodiments, multicarrier receiver 400 may comprise demultiplexer 406 to generate groups of symbol vectors 407 by combining corresponding subcarrier frequency components of received symbol vectors 405. Each group of symbol vectors 407 may have symbol components combined from different subcarriers. In some embodiments, symbol vectors 407 may be generated by demultiplexer 406 in G groups (two groups are illustrated in FIG. 4). In some embodiments, each of symbol vectors 407 may have a length of M×K encoded symbols. In some embodiments, demultiplexer 406 may reshape row vectors into column vectors to collect and group information from some subcarriers received on all receive antennas 402, although the scope of the invention is not limited in this respect.

Multicarrier receiver 400 may also comprise null canceller 408 associated with each group of symbol vectors 407 to perform null canceling on a per-subcarrier basis for symbol vectors of the associated group based on a decoded symbol vector 420. Null canceller 408 may generate null-cancelled symbol vectors 409.

Multicarrier receiver 400 may also comprise decoder 410 associated with each group to decode null-cancelled symbol vectors 409. In some embodiments, decoder 410 may be a sphere decoder to spherically decode layers of symbols of the associated group and to multiply an output of decoder 410 (one decoded layer at a time) by a complex-field matrix, which may be referred to as theta. In this way, decoder 410 may regenerate precoded symbol vector 420 (e.g., to regenerate the current layer) for null canceller 408 so that null canceller 408 may cancel the current layer's contribution from symbol vectors 407 until all layers are decoded. In some embodiments, nulling may be done once for each subcarrier while canceling may be done for M-1 iterations until all layers are decoded, although the scope of the invention is not limited in this respect. In some embodiments, decoder 410 may perform maximum-likelihood (ML) detection within a sphere or spherical limit, unlike an exhaustive ML detection. In some embodiments, decoder 410 may generate decoded QAM symbol vectors 411 for each subcarrier of the multicarrier communication channel.

In some embodiments, null canceller 408 may null symbols so that the $i^{th}$ layer may still have interference from the first layer through the $i^{th}-1$ layer, and substantially no interference from the $i^{th}+1$ layer to the $M^{th}$ layer within a symbol vector for a specific subcarrier frequency, although the scope of the invention is not limited in this respect. In some embodiments, null canceller 408 may also cancel some elements in symbol vectors 407 after nulling based on symbol vector 420. This may be performed successively until all layers are decoded. In some embodiments, this may be an iterative process. For example, during a first iteration, nothing may be cancelled so the decoded symbol vector 420 fed back may be zero.

In some embodiments, multicarrier receiver 400 may also comprise FFT circuitry 404 to demodulate subcarriers of the multicarrier communication channel received through receive antennas 402 to generate the received symbol vectors 405 associated with each receive antenna. Received symbol vectors 405 (i.e., from each antenna 402) may include symbol components from each of the subcarriers of the multicarrier communication channel. In some embodiments, the number of receive antennas 402 may be greater than or equal to the number of transmit antennas or spatial channels used in transmitting the multicarrier communication signal, although the scope of the present invention is not limited in this respect.

In some embodiments, multicarrier receiver 400 may also comprise symbol demapper 412 to demap the decoded symbol vectors 111 for each group to generate a plurality of parallel sets of bits 413. Symbol demapper 412 may be QAM demapper, although the scope of the invention is not limited in this respect. In some embodiments, multicarrier receiver 400 may also comprise parallel-to-serial converter 414 to generate serial bit stream 415 from the plurality of parallel sets of bits 413.

In some embodiments, circuitry (not illustrated) may be included in the signal path before FFT circuitry 404 to remove a cyclic prefix (CP) added by the transmitter to help reduce inter-symbol interference, although the scope of the present invention is not limited in this respect.

Multicarrier transmitter 100 (FIG. 1) and/or multicarrier receiver 400 may be part of a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, multicarrier transmitter 100 (FIG. 1) may transmit and multicarrier receiver 400 may receive radio-frequency (RF) communications in accordance with specific communication standards, such as the Institute of Electrical and Electronics Engineers (IEEE) standards including IEEE 802.11 (a), 802.11 (b), 802.11 (g/h) and/or 802.11 (n) standards for wireless local area networks (WLANs) and/or 802.16 standards for wireless metropolitan area networks (WMANs), although transmitter 100 (FIG. 1) and/or receiver 400 may also be suitable to transmit and/or receive communications in accordance with other techniques including the Digital Video Broadcasting Terrestrial (DVB-T) broadcasting standard, and the High performance radio Local Area Network (HiperLAN) standard.

Although some embodiments of the present invention are discussed in the exemplary context of an 802.11×implementation (e.g., 802.11a, 802.11 g, 802.11 HT, etc.), the claims are not so limited. Some embodiments of the present invention may be implemented as part of any wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

In some embodiments, each of transmit antennas 114 (FIG. 1) and each of receive antennas 402 may comprise a directional or omnidirectional antenna, including, for example, a dipole antenna, a monopole antenna, a loop antenna, a microstrip antenna or other type of antenna suitable for reception and/or transmission of RF signals.

In some embodiments, multicarrier transmitter 100 (FIG. 1) and/or multicarrier receiver 400 may be part of a single multicarrier communication station. Although multicarrier transmitter 100 (FIG. 1) and/or multicarrier receiver 400 are illustrated as part of one or more wireless communication devices, multicarrier transmitter 100 (FIG. 1) and/or multicarrier receiver 400 may be part of almost any wireless or wireline communication device, including a general purpose processing or computing system. In some embodiments, multicarrier transmitter 100 (FIG. 1) and/or multicarrier receiver 400 may be part of a battery-powered device. In some embodiments, when transmitter 100 (FIG. 1) and receiver 400 are part of a communication station, transmit and receive antennas may be shared, although the scope of the invention is not limited in this respect.

Although multicarrier transmitter 100 (FIG. 1) and/or multicarrier receiver 400 are illustrated as having several separate functional elements, one or more of the functional elements may be combined and may be implemented by combinations of software-configured elements, such as processing elements including digital signal processors (DSPs), and/or other hardware elements. For example, the illustrated elements may comprise one or more microprocessors, DSPs, application specific integrated circuits (ASICs), and combinations of various hardware and logic circuitry for performing at least the functions described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Figure 5:
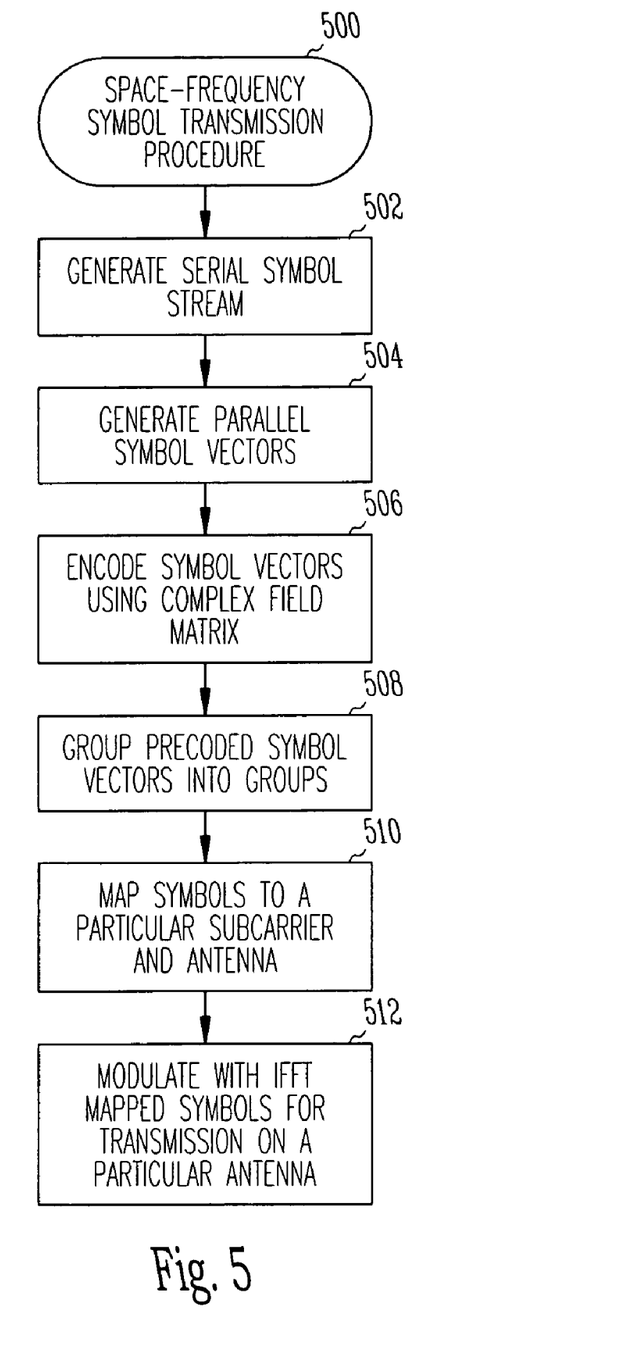
FIG. 5 is a flow chart of a space-frequency symbol transmission procedure in accordance with some embodiments of the present invention.

FIG. 5 is a flow chart of a space-frequency symbol transmission procedure in accordance with some embodiments of the present invention. Space-frequency symbol transmission procedure 500 may be performed by a multicarrier transmitter, such as multicarrier transmitter 100 (FIG. 1), although other multicarrier transmitters may also be suitable. In some embodiments, procedure 500 may encode symbols for transmission over a multicarrier communication channel comprising more than one spatial channel and may use more than one transmit antenna.

Operation 502 comprises generating a serial symbol stream from an input serial bit stream. In some embodiments, operation 502 may be performed by a symbol mapper, such as mapper 102 (FIG. 1).

Operation 504 comprises generating a plurality of parallel symbol vectors from the serial symbol stream. Each of the symbol vectors may have more than one symbol. In some embodiments, operation 504 may be performed by a serial-to-parallel converter, such as serial-to-parallel converter 104 (FIG. 1).

Operation 506 comprises encoding the plurality of symbol vectors by multiplying each of the symbol vectors by a complex field matrix to generate precoded symbol vectors. In some embodiments, operation 506 comprises encoding the symbol vectors with a linear-square precoder to separately precode each of the plurality of parallel symbol vectors to generate a plurality of parallel precoded symbol vectors. In some embodiments, the complex field matrix may be a square complex field matrix having substantially a row-wise Vandermonde structure, although the scope of the invention is not limited in this respect. In some embodiments, operation 506 may be performed by a precoder, such as precoder 106 (FIG. 1).

Operation 508 comprises grouping the precoded symbol vectors into a plurality of groups. Each group may have more than one of the precoded symbol vectors. In some embodiments, operation 508 may be performed by a partitioner, such as partitioner 108 (FIG. 1).

Operation 510 comprises mapping precoded symbols of the precoded symbol vectors to one of a plurality of subcarriers of the multicarrier communication channel and to one of a plurality of spatial channels at least in part based on the precoded symbol's group and the precoded symbol's position within the group. In some embodiments, operation 510 may comprise mapping the precoded symbols of the precoded symbol vectors to one of the subcarriers of the multicarrier communication channel and to one of a plurality of transmit antennas. Each transmit antenna may correspond to one of the spatial channels, although the scope of the invention is not limited in this respect. In some embodiments, operation 510 may be performed by a space-frequency symbol mapper, such as space-frequency symbol mapper 110 (FIG. 1).

Operation 512 comprises performing an inverse fast Fourier transform (IFFT) to generate modulated signals for RF transmission on a corresponding one of the spatial channels from space-frequency mapped symbols generated in operation 510.

Figure 6:
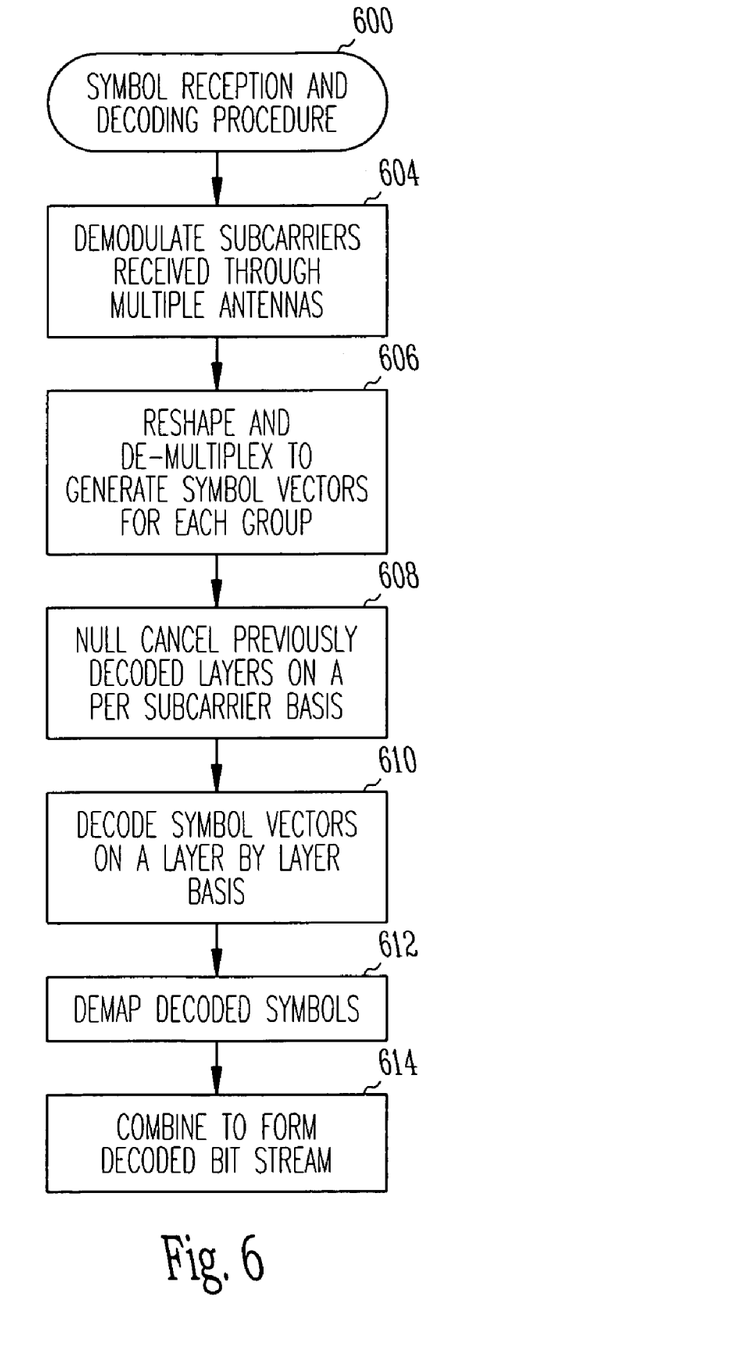
FIG. 6 is a flow chart of a symbol reception and decoding procedure in accordance with some embodiments of the present invention.

FIG. 6 is a flow chart of a symbol reception and decoding procedure in accordance with some embodiments of the present invention. Symbol reception and decoding procedure 600 may be performed by a multicarrier receiver, such as multicarrier receiver 400 (FIG. 4), although other multicarrier receivers may also be suitable. Procedure 600 may be performed to decode signals that were transmitted by a multicarrier transmitter, such as multicarrier transmitter 100 (FIG. 1) or to decode multicarrier signals that were generated by procedure 500 (FIG. 5), although the scope of the invention is not limited in this respect.

Operation 604 comprises demodulating subcarriers of the multicarrier communication signal received over a plurality of receive antennas to generate the received symbol vectors associated with each receive antenna. In some embodiments, the received symbol vectors may include symbol components from each of the subcarriers of the multicarrier communication channel. In some embodiments, operation 604 may be performed by FFT circuitry, such as FFT circuitries 404 (FIG. 4).

Operation 606 comprises generating groups of symbol vectors by combining corresponding subcarrier frequency components of the received symbol vectors. In some embodiments, operation 606 comprises reshaping and/or demultiplexing the symbol vectors. In some embodiments, each group of symbol vectors may comprise symbol components combined from different subcarriers. In some embodiments, operation 606 may be performed by a demultiplexer, such as demultiplexer 406 (FIG. 4).

Operation 608 comprises performing null canceling on a per-subcarrier basis for symbol vectors of an associated group based on a decoded symbol vector to generate null-cancelled symbol vectors. In some embodiments, operation 608 may iteratively cancel interference from the symbol vectors in successive layers. In some embodiments, null canceller may null interference from symbol vectors 407 (FIG. 4) so that the $i^{th}$ layer may still have interference from first to the $i^{th}-1$ layer, and may have substantially no interference from the $i^{th}+1$ layer to the $M^{th}$ layer, although the scope of the invention is not limited in this respect. In some embodiments, operation 608 may be performed by null cancellers, such as null cancellers 408 (FIG. 4).

Operation 610 comprises decoding layers of symbols of the associated group by multiplying a decoded output one layer at a time by a complex-field matrix to regenerate symbol vectors for performing the null canceling. In some embodiments, operation 610 may be performed by decoders, such as decoders 410 (FIG. 4). In some embodiments, operation 610 comprises spherically decoding to generate decoded QAM symbol vectors for each subcarrier of the multicarrier communication channel, although the scope of the invention is not limited in this respect.

Operation 612 comprises demapping the decoded symbol vectors for each group to generate a plurality of parallel sets of bits. Operation 612 may be performed by a symbol demapper, such as demapper 412 (FIG. 4).

Operation 614 comprises generating a serial bit stream from the plurality of parallel sets of bits. In some embodiments, operation 614 may be performed by a parallel-to-serial converter, such as parallel-to-serial converter 414 (FIG. 4).

Although the individual operations of procedures 500 and 600 are illustrated and described as separate operations, one or more of the individual operations may be performed concurrently, and nothing requires that the operations be performed in the order illustrated.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A multicarrier transmitter comprising:
a precoder to encode a plurality of symbol vectors by multiplying each of the symbol vectors by a complex field matrix to generate precoded symbol vectors;
a partitioner to group the precoded symbol vectors into a plurality of groups, each group having more than one of the precoded symbol vectors; and
a space-frequency symbol mapper to map precoded symbols of the precoded symbol vectors to one of a plurality of subcarriers of a multicarrier communication channel and to one of a plurality of spatial channels at least in part based on the precoded symbol's group and the precoded symbol's position within the group,
wherein the multicarrier carrier transmitter is configured to be coupled with a plurality of transmit antennas, each transmit antenna corresponding to one of the spatial channels.

2. The transmitter of claim 1 further comprising:
a symbol mapper to generate a serial symbol stream from an input serial bit stream; and
a serial-to-parallel converter to generate the plurality of parallel symbol vectors from the serial symbol stream, each of the symbol vectors having more than one symbol.

3. The transmitter of claim 2 further comprising inverse fast Fourier transform (IFFT) circuitry to generate signals for radio-frequency (RF) transmission on a corresponding one of the spatial channels from space-frequency mapped symbols provided by space-frequency symbol mapper.

4. The transmitter of claim 1 wherein the precoder is a linear-square precoder to separately precode each of the plurality of parallel symbol vectors to generate a plurality of parallel precoded symbol vectors.

5. The transmitter of claim 1 wherein the precoder encodes an M×G number of parallel symbol vectors, each parallel symbol vector having M×K symbols,
wherein the partitioner groups the precoded symbol vectors into G groups of the parallel symbol vectors, each group having M of the precoded symbol vectors,
wherein M, G and K are positive integers,
wherein M×K×G is equal to a number of data subcarriers of the multicarrier communication channel, and
wherein M corresponds to a number of the transmit antennas.

6. The transmitter of claim 5 wherein symbols of the precoded symbol vectors are associated with a layer of symbols, wherein a number of layers is M for each group,
wherein the space-frequency symbol mapper maps each precoded symbol of the precoded symbol vectors to one of the subcarriers and to one of the transmit antennas based on the group and the layer associated with the symbol, and
wherein the space-frequency symbol mapper maps M×K×G symbols to each transmit antenna and provides the mapped symbols in multiples of the M×K×G symbols to IFFT circuitry associated with the transmit antennas for modulation on the subcarriers.

7. The transmitter of claim 5 wherein the space-frequency symbol mapper maps at least some symbols of the layers to the subcarriers and the transmit antennas in a sequential manner based on the symbols group and position within the group.

8. A multicarrier transmitter comprising:
a precoder to encode a plurality of symbol vectors by multiplying each of the symbol vectors by a complex field matrix to generate precoded symbol vectors;
a partitioner to group the precoded symbol vectors into a plurality of groups, each group having more than one of the precoded symbol vectors; and
a space-frequency symbol mapper to map precoded symbols of the precoded symbol vectors to one of a plurality of subcarriers of a multicarrier communication channel and to one of a plurality of spatial channels at least in part based on the precoded symbol's group and the precoded symbol's position within the group,
wherein the precoder is a linear-square precoder to separately precode each of the plurality of parallel symbol vectors to generate a plurality of parallel precoded symbol vectors, and
wherein the complex field matrix is a square complex field matrix having substantially a row-wise Vandermonde structure.

9. A multicarrier transmitter comprising:
a precoder to encode a plurality of symbol vectors by multiplying each of the symbol vectors by a complex field matrix to generate precoded symbol vectors;
a partitioner to group the precoded symbol vectors into a plurality of groups, each group having more than one of the precoded symbol vectors; and
a space-frequency symbol mapper to map precoded symbols of the precoded symbol vectors to one of a plurality of subcarriers of a multicarrier communication channel and to one of a plurality of spatial channels at least in part based on the precoded symbol's group and the precoded symbol's position within the group,
wherein the multicarrier communication channel comprises the plurality of spatial channels, each spatial channel associated with one of the plurality of transmit antennas, wherein each spatial channel employs the same frequency subcarriers as the other spatial channels, p1 wherein the transmit antennas have a spacing therebetween of at least approximately a half-wavelength of a transmit frequency.

10. A multicarrier transmitter comprising:
a precoder to encode a plurality of symbol vectors by multiplying each of the symbol vectors by a complex field matrix to generate precoded symbol vectors;
a partitioner to group the precoded symbol vectors into a plurality of groups, each group having more than one of the precoded symbol vectors; and
a space-frequency symbol mapper to map precoded symbols of the precoded symbol vectors to one of a plurality of subcarriers of a multicarrier communication channel and to one of a plurality of spatial channels at least in part based on the precoded symbol's group and the precoded symbol's position within the group,
wherein the multicarrier communication channel comprises a plurality of symbol-modulated subcarriers, and
wherein each symbol-modulated subcarrier has a null at substantially a center frequency of the other subcarriers to achieve substantial orthogonality between the subcarriers of the multicarrier communication channel.

11. A multicarrier transmitter comprising:
a precoder to encode a plurality of symbol vectors by multiplying each of the symbol vectors by a complex field matrix to generate precoded symbol vectors;
a partitioner to group the precoded symbol vectors into a plurality of groups, each group having more than one of the precoded symbol vectors; and
a space-frequency symbol mapper to map precoded symbols of the precoded symbol vectors to one of a plurality of subcarriers of a multicarrier communication channel and to one of a plurality of spatial channels at least in part based on the precoded symbol's group and the precoded symbol's position within the group,
wherein the transmitter is part of a multicarrier communication station comprising the multicarrier transmitter and a multicarrier receiver, wherein the multicarrier receiver comprises:
a demultiplexer to generate groups of symbol vectors by combining corresponding subcarrier frequency components of received symbol vectors;
a null canceller associated with each group of symbol vectors to perform null canceling on a per-subcarrier basis for symbol vectors of the associated group based on a decoded symbol vector, the null canceller to generate null-cancelled symbol vectors;
a decoder associated with each group to decode layers of symbols of the associated group and multiply an output of the decoder one layer at a time by a complex-field matrix to regenerate symbol vectors for the null canceller.

12. A multicarrier receiver comprising:
a demultiplexer to generate groups of symbol vectors by combining corresponding subcarrier frequency components of received symbol vectors;
a null canceller associated with each group of symbol vectors to perform null canceling on a per-subcarrier basis for symbol vectors of the associated group based on a decoded symbol vector, the null canceller to generate null-cancelled symbol vectors;
a decoder associated with each group to decode layers of symbols of the associated group and multiply an output of the decoder one layer at a time by a complex-field matrix to regenerate symbol vectors for the null canceller.

13. The receiver of claim 12 wherein the null canceller iteratively cancels interference from the symbol vectors in successive layers.

14. The receiver of claim 12 wherein each group of symbol vectors generated by the demultiplexer comprises symbol components combined from different subcarriers, and
wherein the decoder is a sphere decoder and generates decoded quadrature amplitude modulated symbol vectors for each subcarrier of the multicarrier communication channel.

15. The receiver of claim 12 further comprising:
FFT circuitry to demodulate received subcarriers of the multicarrier communication signal received over a plurality of receive antennas to generate the received symbol vectors associated with each receive antenna, the received symbol vectors comprising symbol components from a plurality of subcarriers of the multicarrier communication channel;
a demapper to demap the decoded symbol vectors for each group to generate a plurality of parallel sets of bits; and
a parallel to serial converter to generate a serial bit stream from the plurality of parallel sets of bits.

16. The receiver of claim 12 wherein the receiver is part of a multicarrier communication station comprising the multicarrier receiver and a multicarrier transmitter, wherein the multicarrier transmitter comprises:
a precoder to encode a plurality of symbol vectors by multiplying each of the symbol vectors by a complex field matrix to generate precoded symbol vectors;
a partitioner to group the precoded symbol vectors into a plurality of groups, each group having more than one of the precoded symbol vectors; and
a space-frequency symbol mapper to map precoded symbols of the precoded symbol vectors to one of a plurality of subcarriers of a multicarrier communication channel and to one of a plurality of spatial channels at least in part based on the precoded symbol's group and the precoded symbol's position within the group.

17. A communication station comprising:
a plurality of antennas;
a multicarrier transmitter to encode symbols with space-frequency block codes for transmission over a multicarrier communication channel; and
a multicarrier receiver, to decode signals received over the multicarrier communication channel encoded with the space-frequency block codes using an iterative nulling process to successively cancel interference from layers of symbols,
wherein the space-frequency block codes comprise precoded symbols mapped to the plurality of transmit antennas and to subcarriers of the multicarrier communication channel.

18. The communication station of claim 17 wherein the multicarrier transmitter comprises:
a precoder to encode a plurality of symbol vectors by multiplying each of the symbol vectors by a complex field matrix to generate precoded symbol vectors;
a partitioner to group the precoded symbol vectors into a plurality of groups, each group having more than one of the precoded symbol vectors; and
a space-frequency symbol mapper to map the precoded symbols of the precoded symbol vectors to one of a plurality of subcarriers of the multicarrier communication channel and to one of a plurality of spatial channels at least in part based on the precoded symbol's group and the precoded symbol's position within the group.

19. The communication station of claim 17 wherein the multicarrier receiver comprises:
a demultiplexer to generate groups of symbol vectors by combining corresponding subcarrier frequency components of received symbol vectors;
a null canceller associated with each group of symbol vectors to perform null canceling on a per-subcarrier basis for symbol vectors of the associated group based on a decoded symbol vector, the null canceller to generate null-cancelled symbol vectors;
a decoder associated with each group to decode layers of symbols of the associated group and multiply an output of the decoder one layer at a time by a complex-field matrix to regenerate symbol vectors for the null canceller.

20. A method of transmitting over a multicarrier communication channel comprising:
encoding a plurality of symbol vectors by multiplying each of the symbol vectors by a complex field matrix to generate precoded symbol vectors;
grouping the precoded symbol vectors into a plurality of groups, each group having more than one of the precoded symbol vectors; and
mapping precoded symbols of the precoded symbol vectors to one of a plurality of subcarriers of a multicarrier communication channel and to one of a plurality of spatial channels at least in part based on the precoded symbol's group and the precoded symbol's position within the group,
wherein the mapping comprises mapping the precoded symbols of the precoded symbol vectors to one of the subcarriers of the multicarrier communication channel and to one of a plurality of transmit antennas, wherein each transmit antenna corresponds to one of the spatial channels.

21. The method of claim 20 further comprising:
generating a serial symbol stream from an input serial bit stream; and
generating the plurality of parallel symbol vectors from the serial symbol stream, each of the symbol vectors having more than one symbol.

22. The method of claim 21 further comprising performing inverse fast Fourier transform (IFFT) to generate signals for radio-frequency (RF) transmission on a corresponding one of the spatial channels from space-frequency mapped symbols generated by the mapping of the precoded symbols.

23. The method of claim 20 wherein encoding comprises encoding the symbol vectors with a linear-square precoder to separately precode each of the plurality of parallel symbol vectors to generate a plurality of parallel precoded symbol vectors.

24. The method of claim 20 wherein the encoding comprises encoding an M×G number of parallel symbol vectors, each parallel symbol vector having M×K symbols,
wherein the grouping comprises grouping the precoded symbol vectors into G groups of the parallel symbol vectors, each group having M of the precoded symbol vectors,
wherein M, G and K are positive integers,
wherein M×K×G is equal to a number of data subcarriers of the multicarrier communication channel, and
wherein M corresponds to a number of the transmit antennas.

25. The method of claim 24 wherein symbols of the precoded symbol vectors are associated with a layer of symbols, wherein a number of layers is M for each group,
wherein the mapping further comprises mapping each precoded symbol of the precoded symbol vectors to one of the subcarriers and to one of the transmit antennas based on the group and the layer associated with the symbol, and
wherein the mapping further comprises mapping M×K×G symbols to each transmit antenna and to provide the mapped symbols in multiples of the M×K×G symbols for modulation on the subcarriers.

26. The method of claim 24 wherein the mapping comprises mapping at least some symbols of the layers to the subcarriers and the transmit antennas in a sequential manner based on the symbols group and position within the group.

27. A method of transmitting over a multicarrier communication channel comprising:
encoding a plurality of symbol vectors by multiplying each of the symbol vectors by a complex field matrix to generate precoded symbol vectors;
grouping the precoded symbol vectors into a plurality of groups, each group having more than one of the precoded symbol vectors; and
mapping precoded symbols of the precoded symbol vectors to one of a plurality of subcarriers of a multicarrier communication channel and to one of a plurality of spatial channels at least in part based on the precoded symbol's group and the precoded symbol's position within the group,
wherein encoding comprises encoding the symbol vectors with a linear-square precoder to separately precode each of the plurality of parallel symbol vectors to generate a plurality of parallel precoded symbol vectors, and
wherein the complex field matrix is a square complex field matrix having substantially a row-wise Vandermonde structure.

28. A method of transmitting over a multicarrier communication channel comprising:
encoding a plurality of symbol vectors by multiplying each of the symbol vectors by a complex field matrix to generate precoded symbol vectors;
grouping the precoded symbol vectors into a plurality of groups, each group having more than one of the precoded symbol vectors; and
mapping precoded symbols of the precoded symbol vectors to one of a plurality of subcarriers of a multicarrier communication channel and to one of a plurality of spatial channels at least in part based on the precoded symbol's group and the precoded symbol's position within the group,
wherein the multicarrier communication channel comprises the plurality of spatial channels, each spatial channel associated with one of the plurality of transmit antennas,
wherein each spatial channel employs the same frequency subcarriers as the other spatial channels,
wherein the transmit antennas have a spacing therebetween of at least approximately a half-wavelength of a transmit frequency.

29. A method of transmitting over a multicarrier communication channel comprising:
encoding a plurality of symbol vectors by multiplying each of the symbol vectors by a complex field matrix to generate precoded symbol vectors;

grouping the precoded symbol vectors into a plurality of groups, each group having more than one of the precoded symbol vectors; and mapping precoded symbols of the precoded symbol vectors to one of a plurality of subcarriers of a multicarrier communication channel and to one of a plurality of spatial channels at least in part based on the precoded symbol's group and the precoded symbol's position within the group, wherein the multicarrier communication channel comprises a plurality of symbol-modulated subcarriers, and wherein each symbol-modulated subcarrier has a null at substantially a center frequency of the other subcarriers to achieve substantial orthogonality between the subcarriers of the multicarrier communication channel.

30. A method of receiving over a multicarrier communication channel comprising:

generating groups of symbol vectors by combining corresponding subcarrier frequency components of received symbol vectors;

performing null canceling on a per-subcarrier basis for symbol vectors of an associated group based on a decoded symbol vector to generate null-cancelled symbol vectors; and decoding layers of symbols of the associated group by multiplying a decoded output one layer at a time by a complex-field matrix to regenerate symbol vectors for performing the null canceling.

31. The method of claim 30 wherein performing null canceling comprises iteratively interference from the symbol vectors in successive layers.

32. The method of claim 30 wherein each group of symbol vectors comprises symbol components combined from different subcarriers, and wherein decoding comprises spherically decoding to generate decoded quadrature amplitude modulated symbol vectors for each subcarrier of the multicarrier communication channel.

33. The method of claim 32 further comprising:

demodulating received subcarriers of the multicarrier communication signal received over a plurality of receive antennas to generate the received symbol vectors associated with each receive antenna, the received symbol vectors comprising symbol components from a plurality of subcarriers of the multicarrier communication channel;

demapping the decoded symbol vectors for each group to generate a plurality of parallel sets of bits; and generating a serial bit stream from the plurality of parallel sets of bits.

34. A system comprising:

a plurality of substantially omnidirectional transmit antennas;

a multicarrier transmitter coupled to the transmit antennas, the multicarrier transmitter comprising:

a precoder to encode a plurality of symbol vectors by multiplying each of the symbol vectors by a complex field matrix to generate precoded symbol vectors;

a partitioner to group the precoded symbol vectors into a plurality of groups, each group having more than one of the precoded symbol vectors; and a space-frequency symbol mapper to map precoded symbols of the precoded symbol vectors to one of a plurality of subcarriers of a multicarrier communication channel and to one of a plurality of spatial channels at least in part based on the precoded symbol's group and the precoded symbol's position within the group, wherein each transmit antenna corresponds to one of the spatial channels.

35. The system of claim 34 wherein the transmitter further comprises:

a symbol mapper to generate a serial symbol stream from an input serial bit stream; and a serial-to-parallel converter to generate the plurality of parallel symbol vectors from the serial symbol stream, each of the symbol vectors having more than one symbol.

36. The system of claim 35 wherein the transmitter further comprises inverse fast Fourier transform (IFFT) circuitry to generate signals for radio-frequency (RF) transmission on a corresponding one of the spatial channels from space-frequency mapped symbols provided by space-frequency symbol mapper.

37. A computer-readable medium that stores instructions for execution by one or more processors which cause the processors to perform operations comprising:

encoding a plurality of symbol vectors by multiplying each of the symbol vectors by a complex field matrix to generate precoded symbol vectors;

grouping the precoded symbol vectors into a plurality of groups, each group having more than one of the precoded symbol vectors; and mapping precoded symbols of the precoded symbol vectors to one of a plurality of subcarriers of a multicarrier communication channel and to one of a plurality of spatial channels at least in part based on the precoded symbol's group and the precoded symbol's position within the group, wherein the mapping comprises mapping the precoded symbols of the precoded symbol vectors to one of the subcarriers of the multicarrier communication channel and to one of a plurality of transmit antennas, wherein each transmit antenna corresponds to one of the spatial channels.

38. The computer-readable machine readable medium of claim 37 wherein the instructions, when further executed by one or more of the processors cause the processors to perform operations further comprising:

generating a serial symbol stream from an input serial bit stream; and generating the plurality of parallel symbol vectors from the serial symbol stream, each of the symbol vectors having more than one symbol.

39. The computer-readable machine readable medium of claim 38 wherein the instructions, when further executed by one or more of the processors cause the processors to perform operations further comprising performing inverse fast Fourier transform (IFFT) to generate signals for radio-frequency (RF) transmission on a corresponding one of the spatial channels from space-frequency mapped symbols generated by the mapping of the precoded symbols.

* * * * *

UNITED STATES PATENT AND TRADEMARK OFFICE
CERTIFICATE OF CORRECTION

PATENT NO. : 7,315,577 B2 Page 1 of 1
APPLICATION NO. : 10/814113
DATED : January 1, 2008
INVENTOR(S) : Shao It is certified that error appears in the above-identified patent and that said Letters Patent is hereby corrected as shown below:

On the Title page, item (54), in column 1, line 2, delete "METHOD" and insert -- METHODS --, therefor.

Column 1, line 2, delete "METHOD" and insert -- METHODS --, therefor.

Column 11, line 48, in Claim 1, after "multicarrier" delete "carrier".

Column 13, line 2, in Claim 9, after "channels," delete "p1".

Column 17, line 30, in Claim 31, after "iteratively" insert -- canceling --.

Column 18, line 44, in Claim 38, after "computer-readable" delete "machine readable".

Column 18, line 54, in Claim 39, after "computer-readable" delete "machine readable".

Signed and Sealed this

Twentieth Day of May, 2008

JON W. DUDAS
*Director of the United States Patent and Trademark Office*